US012779865B2

(12) United States Patent

Koshikawa et al.

(10) Patent No.: US 12,779,865 B2
(45) Date of Patent: Nov. 3, 2026

(54) CARTRIDGE, CARTRIDGE SET, AND LIQUID EJECTION APPARATUS

(71) Applicant: CANON KABUSHIKI KAISHA, Tokyo (JP)

(72) Inventors: Hiroshi Koshikawa, Kanagawa (JP); Keisuke Iinuma, Kanagawa (JP); Tatsuo Nanjo, Kanagawa (JP); Ken Takenaga, Kanagawa (JP); Atsushi Kohnotoh, Tokyo (JP); Shuhei Yamaguchi, Kanagawa (JP); Kousuke Tanaka, Kanagawa (JP); Daiju Takeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 18/778,955

(22) Filed: Jul. 20, 2024

(65) Prior Publication Data

US 2025/0065637 A1 Feb. 27, 2025

(30) Foreign Application Priority Data

Aug. 25, 2023 (JP) ................................ 2023-137058

(51) Int. Cl.
*B41J 2/175* (2006.01)

(52) U.S. Cl.
CPC ....... *B41J 2/17553* (2013.01); *B41J 2/17509* (2013.01); *B41J 2/1752* (2013.01); *B41J 2/1753* (2013.01); *B41J 2/17546* (2013.01)

(58) Field of Classification Search
CPC .. B41J 2/17553; B41J 2/17509; B41J 2/1752; B41J 2/1753; B41J 2/17546; B41J 2/17513; B41J 2/17523
See application file for complete search history.

(56) References Cited

U.S. PATENT DOCUMENTS

2005/0270346 A1 12/2005 Chen ................................ 347/86
2009/0179979 A1 7/2009 Nanjo et al. ............. B41J 2/175
(Continued)

FOREIGN PATENT DOCUMENTS

EP 3421246 A1 * 1/2019 .............. B41J 2/155
EP 4039479 A1 * 8/2022 ................ B41J 2/05

OTHER PUBLICATIONS

Kitawaki et al., "Thermal Head Cartridge and Liquid Ejection Device" (EP 4 039 479 A1), Aug. 10, 2022, [Paragraphs 0018, 0031, 0033-0055] (Year: 2022).*
(Continued)

*Primary Examiner* — Lisa Solomon
(74) *Attorney, Agent, or Firm* — Venable LLP

(57) ABSTRACT

A cartridge set including first and second cartridges to eject a liquid while moving in a scanning direction in a state of being mounted on a liquid ejection apparatus. The first cartridge includes a first storage unit configured to store the liquid, a first element substrate including a first ejection port configured to eject the liquid and a first element configured to generate energy used to eject the liquid, and a first electric wiring member electrically connected with the first element substrate, the second cartridge includes a second storage unit configured to store the liquid, a second element substrate including a second ejection port configured to eject the liquid and a second element configured to generate energy used to eject the liquid, and a second electric wiring member electrically connected with the second element substrate. The second cartridge is arranged in parallel to the first cartridge along the scanning direction.

11 Claims, 8 Drawing Sheets

(56) References Cited

U.S. PATENT DOCUMENTS

| | | | | |
|---|---|---|---|---|
| 2011/0096128 | A1 | 4/2011 | Ogura et al. | B41J 2/175 |
| 2012/0300003 | A1 | 11/2012 | Takada et al. | B41J 2/175 |
| 2013/0222488 | A1 | 8/2013 | Miyashita et al. | B41J 2/175 |
| 2013/0222491 | A1 | 8/2013 | Nanjo et al. | B41J 2/175 |
| 2015/0375512 | A1 | 12/2015 | Kondo et al. | B41J 2/175 |
| 2015/0375514 | A1 | 12/2015 | Koshikawa et al. | B41J 2/175 |
| 2016/0200113 | A1 | 7/2016 | Nanjo et al. | B41J 2/175 |
| 2016/0200114 | A1 | 7/2016 | Nanjo et al. | B41J 2/175 |
| 2017/0120606 | A1 | 5/2017 | Koshikawa et al. | B41J 2/175 |
| 2017/0120608 | A1 | 5/2017 | Takaoka et al. | B41J 2/175 |
| 2017/0120609 | A1 | 5/2017 | Kimura et al. | B41J 2/175 |
| 2017/0120612 | A1 | 5/2017 | Fukuchi et al. | B41J 2/175 |
| 2017/0120613 | A1 | 5/2017 | Ikebe et al. | B41J 2/175 |
| 2019/0299649 | A1 | 10/2019 | Shimoyama et al. | B41J 2/045 |
| 2020/0079096 | A1 | 3/2020 | Iinuma et al. | B41J 2/175 |
| 2021/0300052 | A1 | 9/2021 | Takei et al. | B41J 2/175 |
| 2021/0300055 | A1 | 9/2021 | Koshikawa et al. | B41J 2/175 |
| 2021/0362506 | A1 | 11/2021 | Kishikawa et al. | B41J 2/175 |
| 2022/0009244 | A1 | 1/2022 | Matsumura et al. | B41J 2/175 |
| 2022/0032633 | A1 | 2/2022 | Shimada et al. | B41J 2/175 |
| 2022/0097388 | A1 | 3/2022 | Nanjo et al. | B41J 2/175 |
| 2022/0258486 | A1 | 8/2022 | Kohnotoh | B41J 2/175 |
| 2023/0135411 | A1 | 5/2023 | Koshikawa | B41J 2/175 |
| 2023/0139685 | A1 | 5/2023 | Koshikawa | B41J 2/175 |
| 2023/0405995 | A1 | 12/2023 | Shimada et al. | B41J 2/175 |
| 2024/0286787 | A1 | 8/2024 | Noda et al. | B65D 1/36 |
| 2024/0300245 | A1 | 9/2024 | Hayasaka et al. | B41J 2/175 |
| 2024/0343044 | A1 | 10/2024 | Kondo et al. | B41J 2/175 |

OTHER PUBLICATIONS

Ishimatsu et al., "Liquid Ejection Head" (EP 3 421 246 A1), Jan. 2, 2019, [Paragraphs 0017, 0031, Fig. 9] (Year: 2019).*
U.S. Appl. No. 18/737,989, filed Jun. 8, 2024.
U.S. Appl. No. 18/752,383, filed Jun. 24, 2024.
U.S. Appl. No. 18/762,423, filed Jul. 2, 2024.
U.S. Appl. No. 18/771,686, filed Jul. 12, 2024.

* cited by examiner

CARTRIDGE, CARTRIDGE SET, AND LIQUID EJECTION APPARATUS

CROSS REFERENCE TO PRIORITY APPLICATION

This application claims the benefit of Japanese Patent Application No. 2023-137058, filed Aug. 25, 2023, which is hereby incorporated by reference herein in its entirety.

BACKGROUND

Field of the Invention

The present disclosure relates to a cartridge, a cartridge set, and a liquid ejection apparatus.

Description of the Related Art

In general, there is a liquid ejection head cartridge (a cartridge) that includes a storage unit that can store a liquid and an ejection unit (a printing head) that can eject the liquid. There is also a serial type liquid ejection apparatus that allows a cartridge set, which includes multiple liquid ejection head cartridges, to be mounted on a carriage that can be moved in a scanning direction. The serial type liquid ejection apparatus can perform printing on a printing medium (a sheet) while moving the carriage on which the cartridge set is mounted along the scanning direction. There has been desired to improve the printing speed of the serial type liquid ejection apparatus.

United States Patent Application Publication No. 2005/0270346 discloses a configuration in which a printing head (an element substrate) included in one of two cartridges mounted on one carriage is arranged close to the other cartridge with an electric wiring member connected to the printing head. With such a configuration, further improvement of the printing speed is implemented than a cartridge in which the center of a main body of the cartridge in a scanning direction coincides with the center of the printing head in the scanning direction. On the other hand, it is also possible to improve the printing speed by thinning a thickness of the cartridge in the scanning direction and shortening a distance of the movement of the cartridge during printing.

SUMMARY

In a case when an electric wiring member and an element substrate are arranged like the printing head disclosed in United States Patent Application Publication No. 2005/0270346, in order to further improve the printing speed, there has been a problem that the thinned cartridge has less space to arrange the electric wiring member. To deal with this, an object of the present disclosure is to provide a cartridge that can further improve the printing speed.

In an aspect of the present disclosure, a cartridge configured to eject a liquid while moving in a scanning direction in a state of being mounted on a liquid ejection includes a storage unit configured to store the liquid, an element substrate including an ejection port configured to eject the liquid stored in the storage unit and an element configured to generate energy used to eject the liquid, and an electric wiring member electrically connected with the element substrate, wherein a center of the element substrate in the scanning direction is offset from a center of the electric wiring member in the scanning direction.

Further features of the present disclosure will become apparent from the following description of exemplary embodiments with reference to the attached drawings.

DESCRIPTION OF THE EMBODIMENTS

First Embodiment

Figure 1:
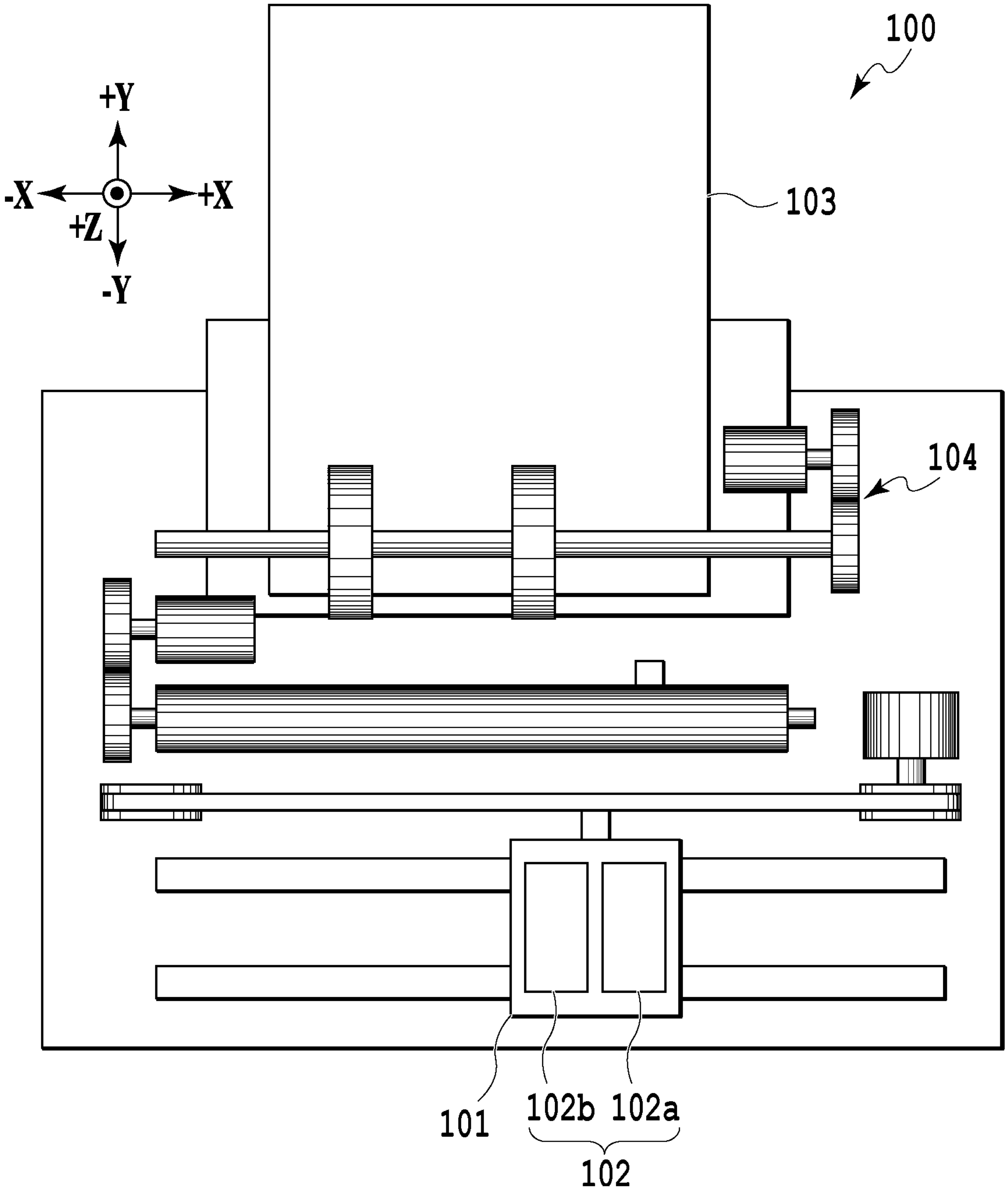
FIG. 1 is a schematic view of a liquid ejection apparatus applicable to an embodiment.

FIG. 1 is a schematic view of a liquid ejection apparatus 100 applicable to the present embodiment.

In FIG. 1, an X direction indicates a scanning direction of a carriage 101. A Y direction indicates a conveyance direction of a printing medium. A Z direction indicates a vertical direction. Note that, the XYZ axes same as that in FIG. 1 are also illustrated in a subsequent drawing that describes only a first liquid ejection head cartridge 102*a* based on a case when the first liquid ejection head cartridge 102*a* is mounted on the liquid ejection apparatus 100. A depth direction of first and second liquid ejection head cartridges 102*a* and 102*b* in a state in which the first and second liquid ejection head cartridges 102*a* and 102*b* are mounted on the liquid ejection apparatus 100 is the Y direction. A width direction of a cartridge set 102 is the X direction. A height direction of the first and second liquid ejection head cartridges 102*a* and 102*b* in the vertical direction is the Z direction.

In the present disclosure, “printing” means not only the formation of significant information (for example, a character, a graphic, or the like, that is visible to be visually sensed by a human). Additionally, “printing” means the formation of insignificant information. In addition, in the present disclosure, “printing” widely means the formation of an image, a design, a pattern, a structure, a combination thereof, or the like on a printing medium or means the processing of the medium.

In the present disclosure, the “printing medium” means a medium that can receive a liquid. An example of the printing medium may include paper used in a common liquid ejection apparatus (for example, a sheet 103). As another example of the printing medium, there may be cloth, a plastic film, a metal plate, glass, ceramics, resin, wood material, leather, and so on.

In the present disclosure, descriptions are given assuming a case when the liquid is an ink. Note that, the liquid applicable to a technique of the present disclosure is not limited to the ink. For example, various liquids including a treatment liquid used to improve the fixability of the ink on the sheet 103, to mitigate the gloss unevenness, and to improve the abrasion resistance may be used as the liquid.

<Liquid Ejection Apparatus 100>

As illustrated in FIG. 1, the liquid ejection apparatus 100 that is serial type and can eject the liquid includes the carriage 101 that can be reciprocally moved in the scanning direction. It is possible to attach and detach the cartridge set 102 to and from the carriage 101.

In the present embodiment, the cartridge set 102 includes the first liquid ejection head cartridge 102*a* and the second liquid ejection head cartridge 102*b*. The first liquid ejection head cartridge 102*a* can store and eject a black color ink. The second liquid ejection head cartridge 102*b* can store and eject three types of color inks, which are cyan, magenta, and yellow. Note that, the types of color inks are not limited to the above-described three colors.

The cartridge set 102 mounted on the carriage 101 can eject the liquid while being moved relatively to the sheet 103. In ejecting, the liquid is ejected from the cartridge set 102 while the carriage 101 is reciprocally moved in the scanning direction. The liquid ejection apparatus 100 includes a conveyance unit 104 that can convey the sheet 103 in the conveyance direction (the Y direction) crossing (in the present embodiment, orthogonal to) the scanning direction by a predetermined amount according to the ejection of the liquid from the cartridge set 102. In the present embodiment, printing is gradually performed on the sheet 103 as described above.

<First Liquid Ejection Head Cartridge 102*a*>

Figure 2:
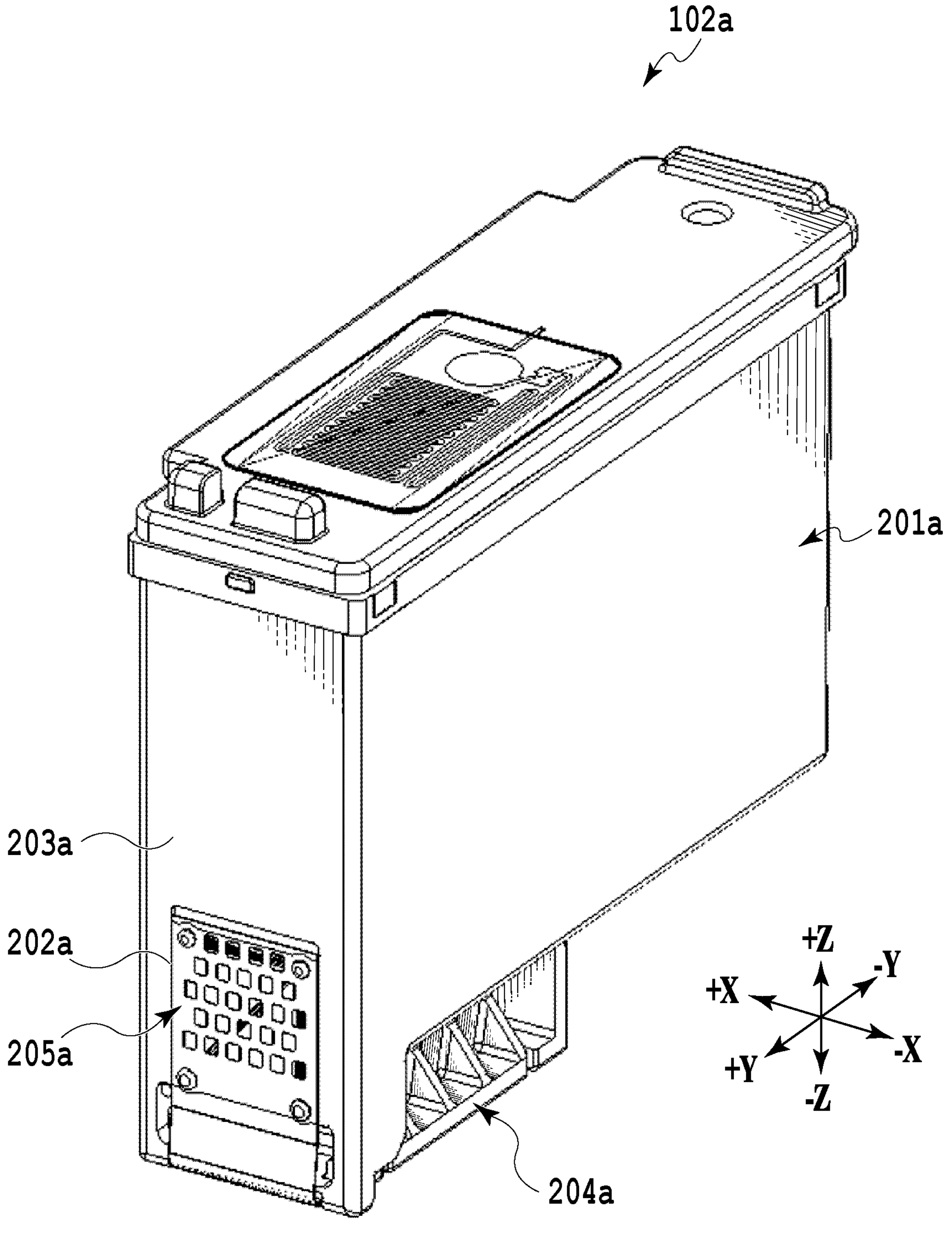
FIG. 2 is an exterior perspective view of a first head cartridge.

FIG. 2 is an exterior perspective view of the first liquid ejection head cartridge 102*a* viewed from the above. Note that, in FIG. 2, the first liquid ejection head cartridge 102*a* is illustrated in orientation that allows for the movement in the scanning direction.

As illustrated in FIG. 2, the first liquid ejection head cartridge 102*a* includes a first storage unit 201*a* that can store the black color ink. A first electric wiring member 202*a* having flexibility is attached to the first storage unit 201*a*.

In the present embodiment, an electric wiring tape is used as the first electric wiring member 202*a*. The first electric wiring member 202*a* is attached in a state of being bent along a first front wall portion 203 and a first bottom portion 204 in the first liquid ejection head cartridge 102*a*. In the first front wall portion 203, a first electric contact 205*a* arranged on the first electric wiring member 202*a* is a terminal that can receive an electric signal transmitted from a main body of the liquid ejection apparatus 100 (see FIG. 1).

A width (a length in the X direction) of the first liquid ejection head cartridge 102*a* is less than a width of the cartridge disclosed in United States Patent Application Publication No. 2005/0270346. Specifically, the width of the cartridge disclosed in United States Patent Application Publication No. 2005/0270346 is 29.5 mm, and a height thereof (a length in the Z direction) is 42.0 mm (except a protrusion portion).

In contrast, the width (the length in the X direction) of the first liquid ejection head cartridge 102*a* is 22.0 mm, and a height thereof (a length in the Z direction) is 56.5 mm (except a protrusion portion). That is, the width of the first liquid ejection head cartridge 102*a* is less than the width of the cartridge disclosed in United States Patent Application Publication No. 2005/0270346 by 7.5 mm.

On the other hand, the height of the first liquid ejection head cartridge 102*a* is greater than the height of the cartridge disclosed in United States Patent Application Publication No. 2005/0270346 by 14.5 mm. Thus, the first liquid ejection head cartridge 102*a* is formed slimmer than the cartridge disclosed in United States Patent Application Publication No. 2005/0270346.

In the present embodiment, a cartridge with an aspect ratio of a long side and a short side of the rectangular first front wall portion 203 is 2.4:1 or greater and 2.8:1 or smaller is defined as a "slim cartridge".

That is, in a state in which the first liquid ejection head cartridge 102*a* is mounted on the carriage 101 (see FIG. 1), a height (a length in the Z direction) and a width (a length in the X direction) of the first front wall portion 203 is within a range of 2.4:1 or greater and 2.8:1 or smaller. Thus, in the orientation in which the first liquid ejection head cartridge 102*a* is moved in the scanning direction, the height of the first front wall portion 203 has a dimension (the length) 2.4 to 2.8 times greater than the width of the first front wall portion 203. Note that, the second liquid ejection head cartridge 102*b* (see FIG. 1) is also a slim cartridge. Additionally, in a case when the width in the scanning direction (the length in the X direction) is 25 mm or less, it is possible to obtain the effect of the present disclosure well.

Figure 3:
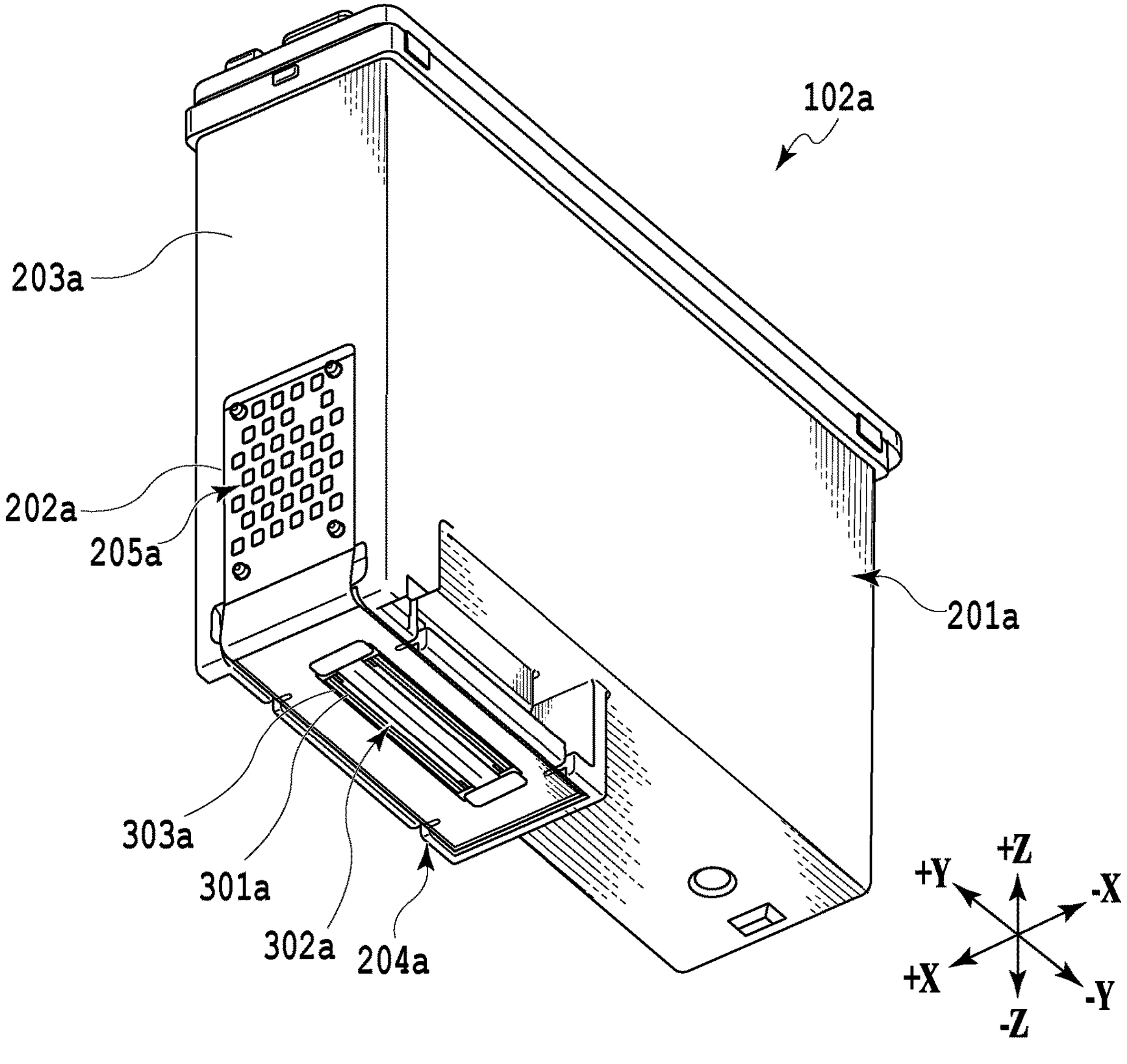
FIG. 3 is an exterior perspective view of the first head cartridge.

FIG. 3 is an exterior perspective view of the first liquid ejection head cartridge 102*a* viewed from below.

As illustrated in FIG. 3, in a case when the first liquid ejection head cartridge 102*a* is mounted on the carriage 101 (see FIG. 1), the main body of the liquid ejection apparatus 100 and a first element substrate 301*a* are electrically connected to each other via the first electric wiring member 202*a*.

The first element substrate 301*a* includes an energy generation element (a first element) that generates energy used to eject the liquid stored in the first storage unit 201*a* and an ejection port formed in a position corresponding to the energy generation element. In the present embodiment, a heater is used as the first element. However, as long as it is possible to generate the energy used to eject the liquid, a piezo element may be applied.

In the first electric wiring member 202*a*, an electric signal path that applies an ejection signal to eject the black color ink to the first element substrate 301*a* is formed. In the first electric wiring member 202*a*, a first opening 303*a* in which the first element substrate 301*a* is assembled is formed. In the vicinity of an edge of the first opening 303*a*, a terminal (not illustrated) connected to an electrode unit (not illustrated) of the first element substrate 301*a* is formed. The first electric contact 205*a* and the terminal (not illustrated) are connected to each other by a continuous copper foil wiring pattern. The terminal (not illustrated) and a bump (not illustrated) of the first element substrate 301*a* are connected to each other by a thermal ultrasonic fixing method, for example.

Note that, the first opening 303*a* is positioned inside a first attachment surface 302*a*. Additionally, the first element substrate 301*a* is positioned inside the first opening 303*a*. Therefore, the first electric wiring member 202*a* does not inhibit the liquid ejection.

Thus, the first liquid ejection head cartridge 102*a* is configured to store the liquid in the first storage unit 201*a* and eject the liquid on to the sheet 103 (see FIG. 1) from the first element substrate 301*a*.

Figure 4:
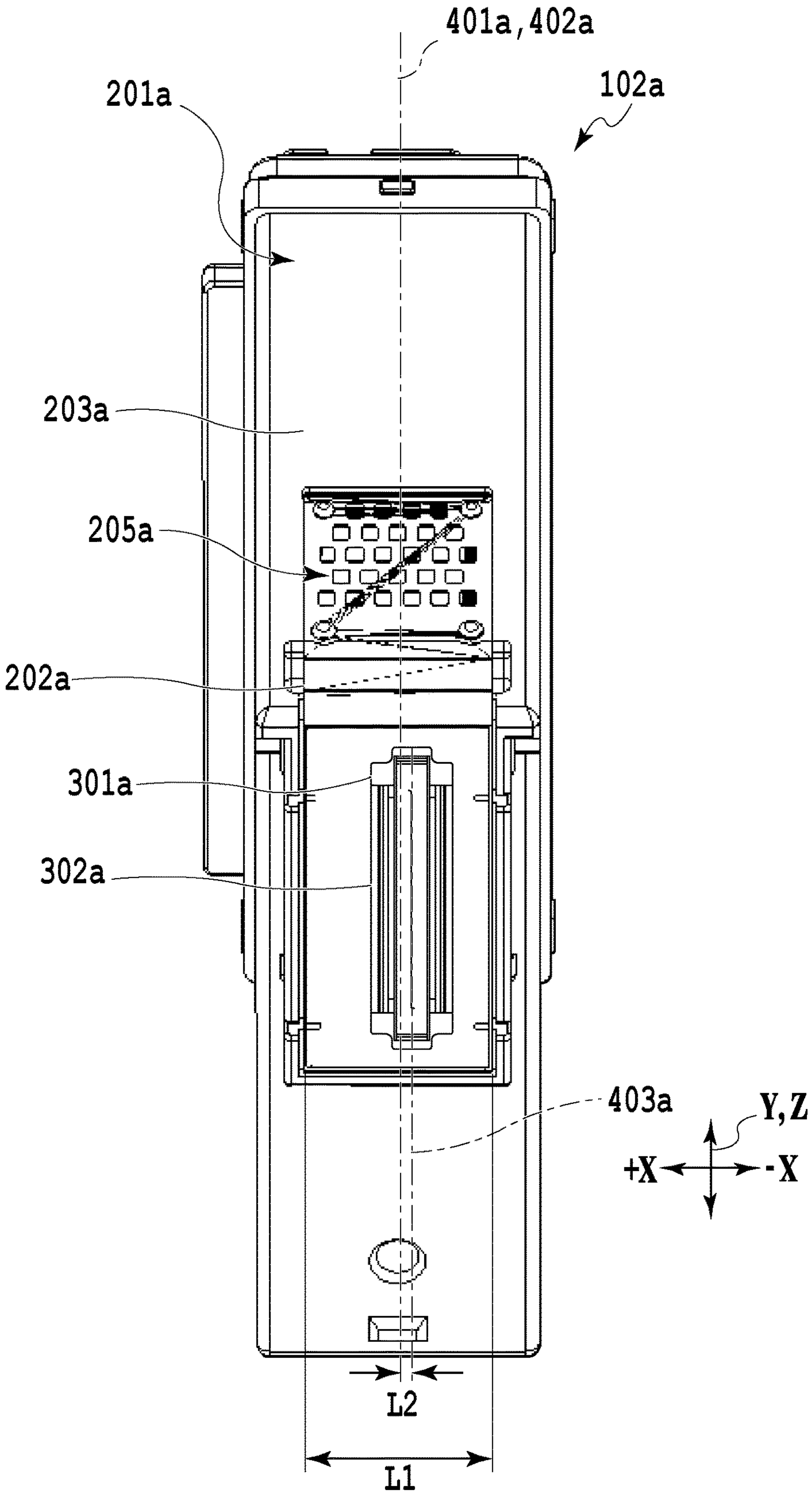
FIG. 4 is a schematic view of a first attachment surface and a first front wall portion.

FIG. 4 illustrates a schematic view illustrating the first attachment surface 302*a* and the first front wall portion 203. Note that, FIG. 4 also illustrates that the first liquid ejection head cartridge 102*a* is in the state of being mounted on the carriage 101 (see FIG. 1).

In FIG. 4, a first center line 401*a* indicates a line passing through the center of the first storage unit 201*a* in the scanning direction (the X direction) and extending along the depth direction (the Y direction). A second center line 402*a* indicates a line passing through the center of the first electric wiring member 202*a* in the scanning direction (the X direction) and extending along the depth direction (the Y direction). A third center line 403*a* indicates a line passing through the center of the first element substrate 301*a* in the scanning direction (the X direction) and extending along the depth direction (the Y direction). In the present embodiment, the shape of the first element substrate 301*a* is rectangular including a long side in the Y direction and a short side in the X direction in a state of a bottom view. The third center line 403*a* is a center line passing through the center of the first element substrate 301*a* in a transverse direction.

The first center line 401*a*, the second center line 402*a*, and the third center line 403*a* are invisible virtual lines passing through the first attachment surface 302*a*. On the first attachment surface 302*a*, the first center line 401*a* and the second center line 402*a* are colinear to each other. That is, the first center line 401*a* and the second center line 402*a* are center lines passing through the center of the first liquid ejection head cartridge 102*a* in the scanning direction. The third center line 403*a* is not colinear to the first center line 401*a* and the second center line 402*a*.

As illustrated in FIG. 4, the shape of the first front wall portion 203 is substantially rectangular including a short side extending along the X direction and a long side extending along the Y direction. In the transverse direction (the X direction) of the first front wall portion 203, the third center line 403*a* is in a position that is parallel to the first center line 401*a* and the second center line 402*a* and closer to the second liquid ejection head cartridge 102*b* (not illustrated) than the second center line 402*a*.

Additionally, it is assumed that the first liquid ejection head cartridge 102*a* and the second liquid ejection head cartridge 102*b* (see FIG. 1) are mounted on the carriage 101 (see FIG. 1). In this state, the third center line 403*a* is parallel to the first center line 401*a* and the second center line 402*a*.

In the state in which the cartridge set 102 (see FIG. 1) is mounted on the carriage 101 (see FIG. 1), the third center line 403*a* is in the position closer to the second liquid ejection head cartridge 102*b* (not illustrated) than the first center line 401*a* and the second center line 402*a*. That is, from the perspective including the entire cartridge set 102, the third center line 403*a* is positioned closer to an inner side (in FIG. 4, a −X direction side) in the scanning direction (the X direction) than the first center line 401*a* and the second center line 402*a*.

A length from the third center line 403*a* to the second center line 402*a* in the scanning direction is within a range of 6.4% to 7.2% of a length of the first electric wiring member 202*a* in the scanning direction. That is, in the X direction, a distance from the third center line 403*a* to the second center line 402*a* is within a range of 6.4% to 7.2% of a width of the first electric wiring member 202*a*. For example, in a case when the width of the first electric wiring member 202*a* (the length in the X direction) is "L1", and an offset distance of the third center line 403*a* from the second center line 402*a* is "L2", "L2" is configured to be within a range of 6.4% to 7.2% of "L1".

With such a configuration, in the X direction, it is possible to allow the center of the first electric wiring member 202*a* to coincide with the center of the first storage unit 201*a*, and to arrange the center of the first element substrate 301*a* and the center of a second element substrate 503*b* (see FIG. 5) close to each other. Therefore, it is possible to divert a conventional method for a step of attaching the first electric wiring member 202*a* and a second electric wiring member 502*b* (see FIG. 5).

In addition, it is also possible to divert the first electric contact 205*a* that has been used. That is, according to the present embodiment, it is possible to arrange two element substrates close to each other without providing an additional space to displace an electric wiring member like United States Patent Application Publication No. 2005/0270346, and it is possible to improve the printing speed.

Additionally, it is unnecessary to change the position of the contact surface as described above. Therefore, it is possible to obtain a similar effect more easily than the head cartridge disclosed in United States Patent Application Publication No. 2005/0270346.

Figure 5:
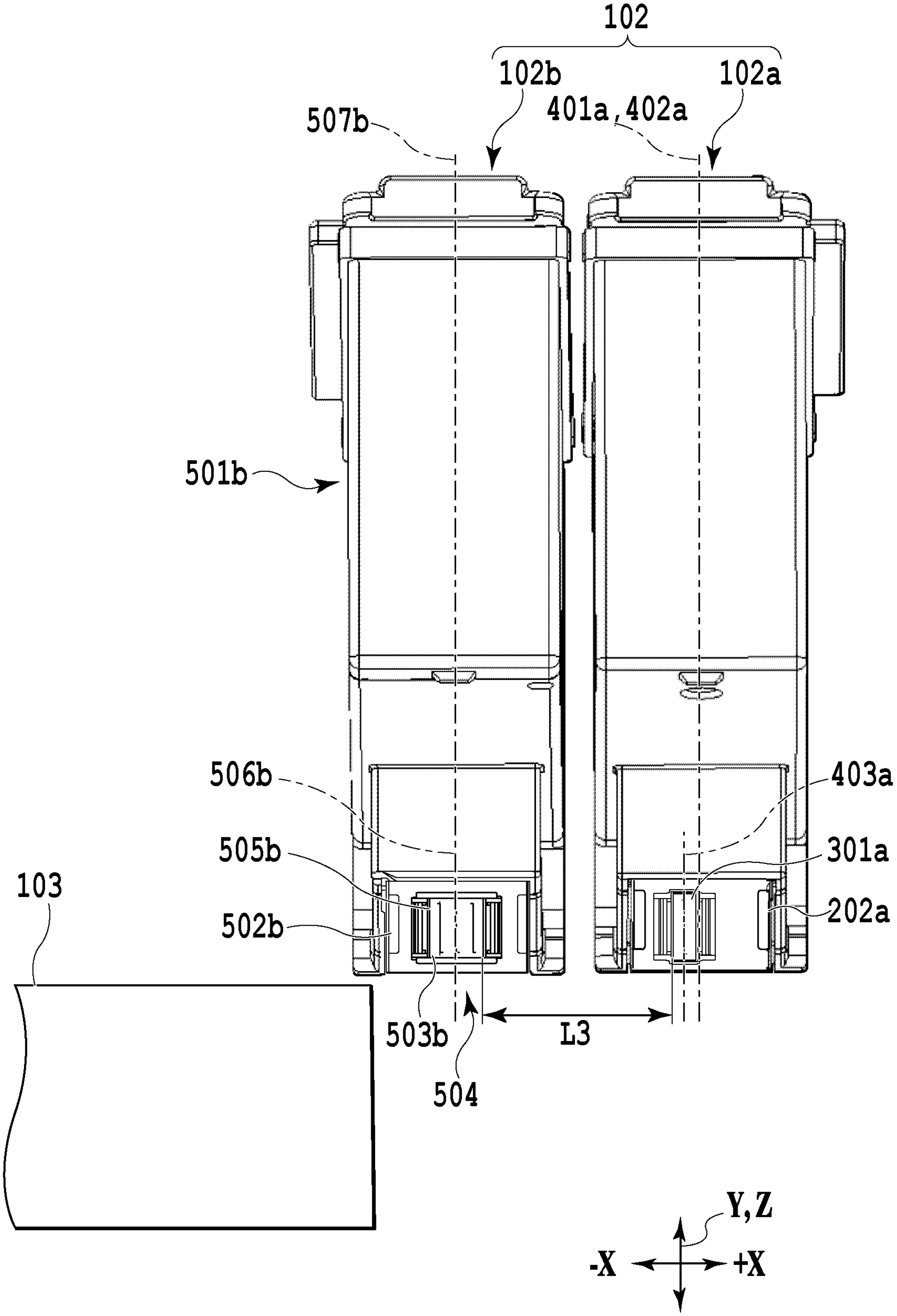
FIG. 5 is a schematic view of a cartridge set in an embodiment.

FIG. 5 is a schematic view of the cartridge set 102 in the present embodiment from obliquely below.

As illustrated in FIG. 5, the cartridge set 102 is configured to eject the liquid in a state of being close to the sheet 103 in a state of being mounted on the carriage 101 (see FIG. 1). Note that, in FIG. 5, the cartridge set 102 is illustrated in orientation where the cartridge set 102 is mounted on the carriage 101. However, in FIG. 5, the carriage 101 is not illustrated for explanatory convenience.

In the state in which the cartridge set 102 is mounted on the carriage 101 (see FIG. 1), the first liquid ejection head cartridge 102*a* and the second liquid ejection head cartridge 102*b* are arranged in parallel along the scanning direction (the X direction).

Note that, in the state in which the cartridge set 102 is mounted on the carriage 101 (see FIG. 1), there is a wall provided to the carriage 101 between the first liquid ejection head cartridge 102*a* and the second liquid ejection head cartridge 102*b*. A length (a thickness) of the wall in the scanning direction (the X direction) is about 1.0 mm. In order to prevent contact to the wall, the first liquid ejection head cartridge 102*a* and the second liquid ejection head cartridge 102*b* are mounted on the carriage 101 (see FIG. 1) in a state of keeping a distance from each other by 1.4 mm or greater and 1.8 mm or smaller.

The second liquid ejection head cartridge 102*b* includes a second storage unit 501*b* that can store the color ink and an ejection unit that can eject the color ink. The second electric wiring member 502*b* having flexibility is attached to the second storage unit 501*b*. In the present embodiment, an electric wiring tape is used as the second electric wiring member 502*b*.

The second electric wiring member 502*b* is attached in a state of being bent along a second front wall portion (not illustrated in FIG. 5) and a second bottom portion 504 in the second liquid ejection head cartridge 102*b*. In the second front wall portion, a second electric contact (not illustrated in FIG. 5) arranged on the second electric wiring member 502*b* is a terminal that can receive an electric signal transmitted from the main body of the liquid ejection apparatus 100 (see FIG. 1).

The ejection unit is arranged on the second bottom portion 504. In the present embodiment, as the ejection unit of the second liquid ejection head cartridge 102*b*, the second element substrate 503*b* that can eject the color ink is arranged.

The second element substrate 503*b* includes an energy generation element (a second element) that generates energy used to eject the liquid stored in the second storage unit 501*b* and an ejection port formed in a position corresponding to the energy generation element. In the present embodiment, a heater is used as the second element However, as long as it is possible to generate the energy used to eject the liquid, a piezo element may be applied. The second element substrate 503*b* is attached to a second attachment surface 505*b* formed on the second bottom portion 504.

A fourth center line 506*b* indicates a line passing through the center of the second element substrate 503*b* in the X direction and extending along the Y direction. A fifth center line 507*b* indicates a line passing through the center of the second electric wiring member 502*b* in the X direction and extending along the Y direction. The fourth center line 506*b* and the fifth center line 507*b* are invisible virtual lines passing through the second attachment surface 505*b*.

In the present embodiment, in the state in which the cartridge set 102 is mounted on the carriage 101 (see FIG. 1), a length from the third center line 403*a* to the fourth center line 506*b* is 22.1 mm. With such a configuration, it is possible to obtain an effect on the improvement of the printing speed greater than that of a liquid ejection apparatus in which a length from the center line of one element substrate to the center line of the other element substrate exceeds 22.1 mm.

Additionally, in the state in which the cartridge set 102 is mounted on the carriage 101, the shortest distance L3 from the second element substrate 503*b* to the first element substrate 301*a* is 18.37 mm in the present embodiment. In other words, a distance from a right side of the second element substrate 503*b* to a left side of the first element substrate 301*a* is 18.37 mm.

With such a configuration, it is possible to obtain an effect on the improvement of the printing speed greater than that of a liquid ejection apparatus in which the shortest distance L3 from the second element substrate 503*b* to the first element substrate 301*a* exceeds 18.37 mm. That is, it is possible to shorten the movement distance of the carriage required to print an image more than the conventional technique by shortening the distance from an ejection port array arranged on the first element substrate 301*a* to an ejection port array arranged on the leftmost side of the second element substrate 503*b* in the X direction more than that in the conventional technique. As a result, it is possible to improve throughput.

Moreover, in ejecting the liquid, the first element substrate 301*a* ejects the liquid in a state of being close to the sheet 103. As described above, the third center line 403*a* (see FIG. 4) is positioned in a position offset from the second center line 402*a* (see FIG. 4) to the inner side (the −X direction side) in the scanning direction (the X direction). Therefore, it is possible to shorten the movement distance of the carriage 101 (see FIG. 1) during the liquid ejection than that of the conventional technique. Accordingly, it is possible to further improve the printing speed and thin the main body size.

Note that, in the present embodiment, the fourth center line 506*b* and the fifth center line 507*b* coincide with each other. Additionally, only the third center line 403*a* is positioned in a position offset to be closer to the second liquid ejection head cartridge 102*b* than the second center line 402*a*. On the other hand, the third center line 403*a* and the second center line 402*a* may coincide with each other, and only the fourth center line 506*b* may be offset to be closer to the first liquid ejection head cartridge 102*a* than the fifth center line 507*b*. With such a configuration, it is also possible to obtain a similar effect as that of the technique of the present disclosure.

Furthermore, the third center line 403*a* and the fourth center line 506*b* may be arranged closer to the inner side of the entire cartridge set 102 in the scanning direction than the second center line 402*a* and the fifth center line 507*b*, respectively. With such a configuration, it is also possible to obtain a similar effect as that of the technique of the present disclosure.

As described above, in the present embodiment, the third center line 403*a* is positioned in a position offset to the inner side (the −X direction side) of the entire cartridge set 102 in the scanning direction (the X direction) than the second center line 402*a*. With such a configuration, it is possible to position the first element substrate 301*a* closer to the inner side in the scanning direction than the conventional technique.

Therefore, with the first liquid ejection head cartridge 102*a*, it is possible to improve the printing speed even in a case where the main body is thinned.

In addition, in the present embodiment, the first center line 401*a* and the second center line 402*a* coincide with each other. Therefore, in a step of providing the electric wiring member to the cartridge, it is possible to divert a manufacturing device and steps used to produce a slim cartridge of the conventional technique and an electric contact included in the slim cartridge of the conventional technique.

Additionally, the configuration of the first electric contact 205*a* has no difference from the electric contact included in the slim cartridge of the conventional technique. Therefore, it is unnecessary to change the position of the contact surface for the electric connection with the first electric contact 205*a*. Accordingly, it is also possible to mount the first liquid ejection head cartridge 102*a* on the carriage on which the slim cartridge of the conventional technique is mounted.

Modification of First Embodiment

Figure 6:
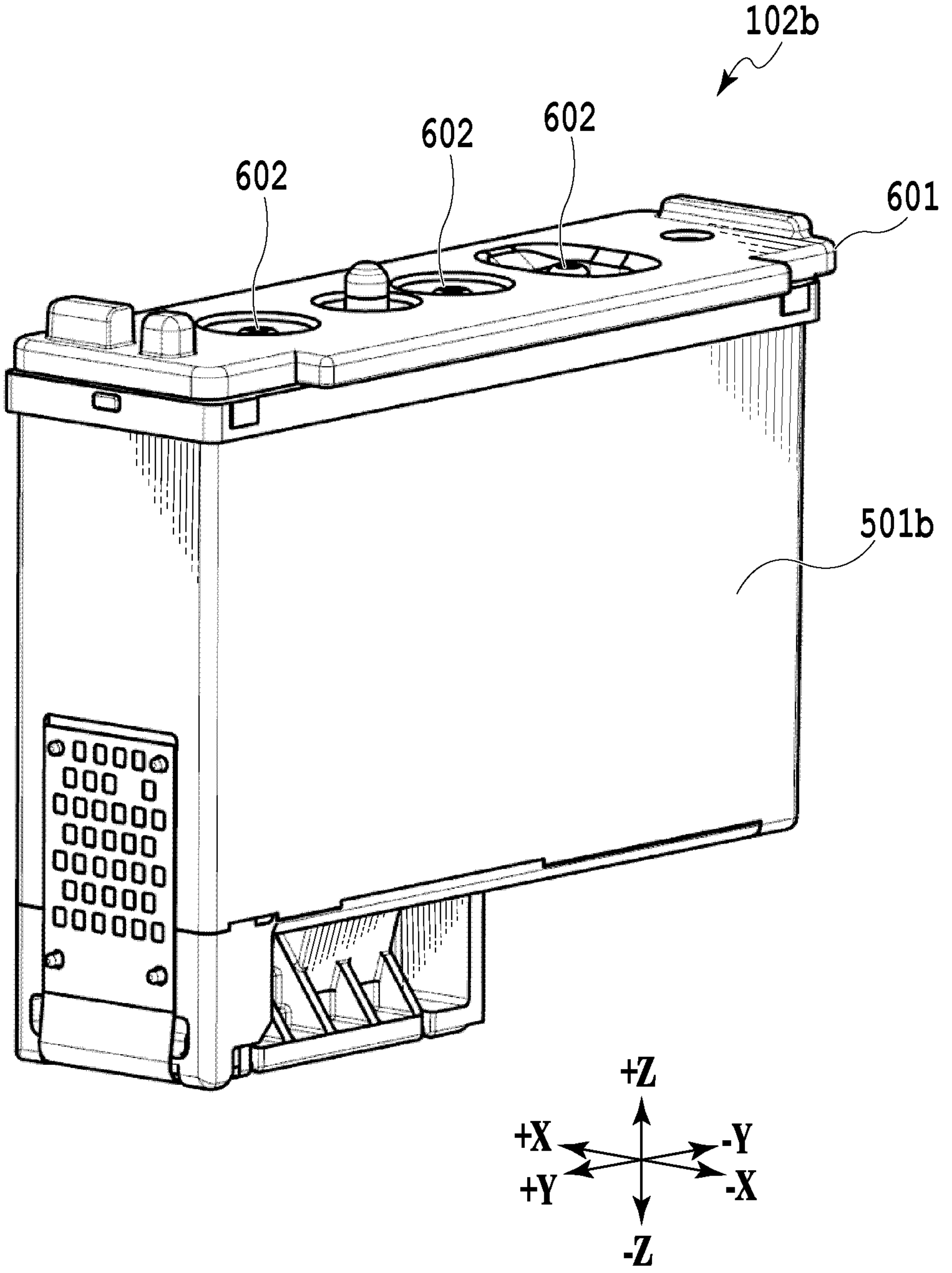
FIG. 6 is an exterior perspective view illustrating a modification of a second head cartridge.

FIG. 6 is an exterior perspective view illustrating a modification of the second liquid ejection head cartridge 102*b*.

As illustrated in FIG. 6, the second liquid ejection head cartridge 102*b* in the present modification includes a lid portion 601 that closes a top portion of the second storage unit 501*b*. In the lid portion 601, a supply port 602 to supply the liquid from a comparatively high-capacity tank (not illustrated) reserving the color ink is formed.

For example, the tank is separately provided to the outside of the liquid ejection apparatus 100 (see FIG. 1). The tank includes a replenishing port (not illustrated) to replenish the color ink into the tank from the outside. The tank and the supply port 602 are connected to each other with a tube (not illustrated). Thus, the liquid is continuously supplied from the tank to the second liquid ejection head cartridge 102*b* in the present modification via the tube.

Therefore, regardless of the size and the number of the sheet 103 (see FIG. 5), the second liquid ejection head cartridge 102*b* in the present modification can perform printing continuously on the sheet 103.

Note that, although it is not illustrated in FIG. 6, a supply port to supply the black color ink from a high-capacity tank is also formed in the first liquid ejection head cartridge 102*a*. Thus, the first liquid ejection head cartridge 102*a* can perform printing continuously on the sheet 103 as well.

Second Embodiment

A second embodiment of the technique of the present disclosure is described below with reference to the drawings. In the following descriptions, a description of a configuration similar or corresponding to that of the first embodiment is omitted, and different points are mainly described. First, a cartridge set 700 of a comparative example is exemplified and described for easy understanding of the present embodiment.

Figure 7:
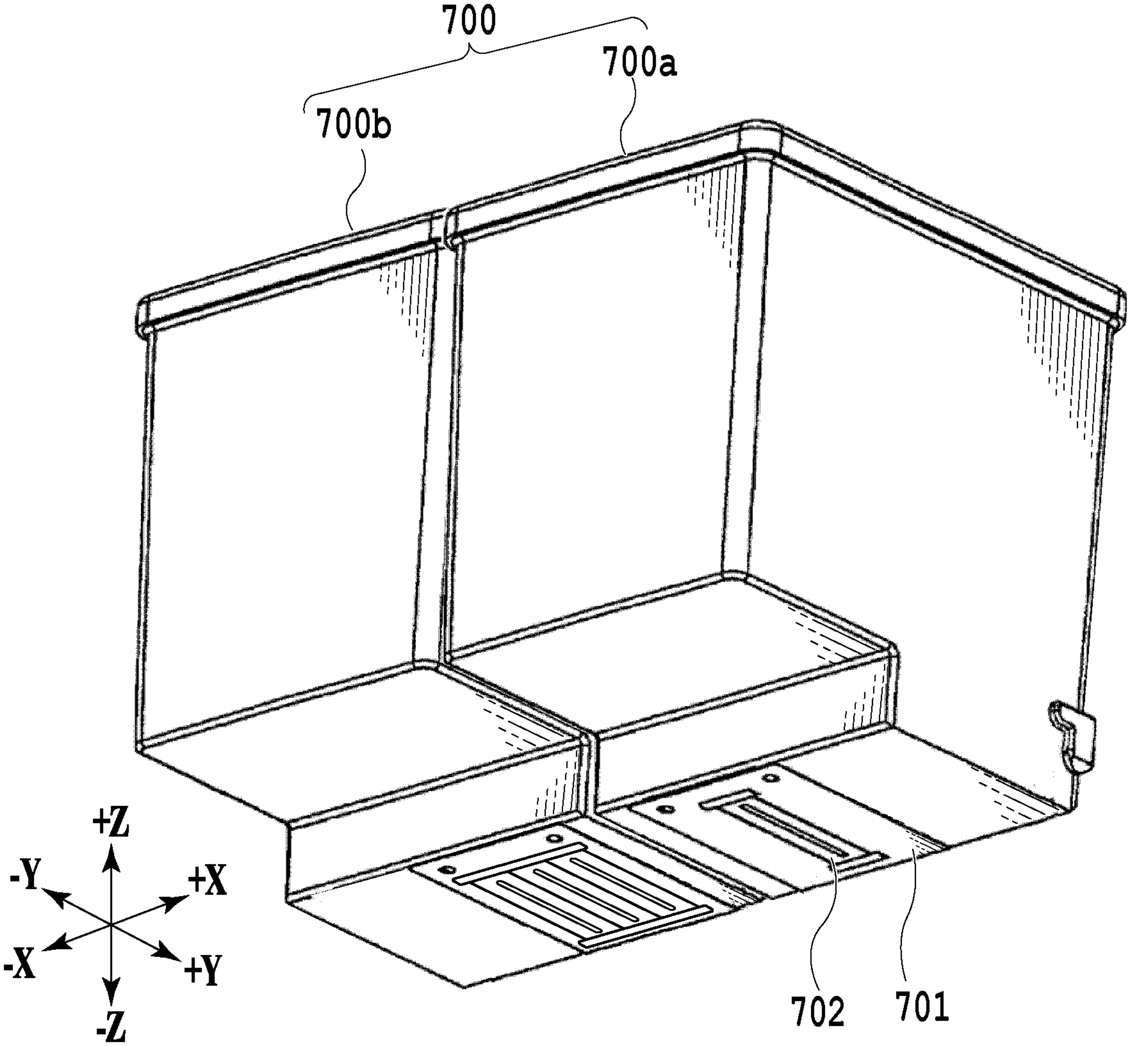
FIG. 7 is a perspective view of a head cartridge set in a conventional technique.

FIG. 7 is a perspective view illustrating the cartridge set 700 as the comparative example, which is assumed based on United States Patent Application Publication No. 2005/0270346. In FIG. 7, the cartridge set 700 is in a state of being mounted on a carriage (not illustrated) that can be moved in the scanning direction (the X direction).

As illustrated in FIG. 7, the cartridge set 700 includes a cartridge 700*a* and a cartridge 700*b*. In a state in which the cartridge 700*a* and the cartridge 700*b* are mounted on the carriage, the cartridge 700*a* and the cartridge 700*b* are arranged adjacent to each other along the scanning direction.

The cartridge 700*a* can eject the liquid stored therein. The cartridge 700*a* includes an electric wiring unit 701 that can receive an electric signal transmitted from a main body of the liquid ejection apparatus (not illustrated) and an element substrate 702 that can eject the liquid. Once a predetermined signal is transmitted from the main body of the liquid ejection apparatus to the electric wiring unit 701, the liquid is ejected from the element substrate 702.

In the present comparative example, in a state in which the centers of the electric wiring unit 701 and the element substrate 702 in the scanning direction coincide with each other, the electric wiring unit 701 and the element substrate 702 are arranged closer to an inner side (an adjacent cartridge side) in the scanning direction than the center of a main body of the cartridge 700*a* in the scanning direction.

In general, in the scanning direction, a length (a width) of the electric wiring unit 701 is greater than a length (a width) of the element substrate 702. Additionally, the center of the electric wiring unit 701 and the center of the element substrate 702 coincide with each other. Accordingly, in a general configuration like the present comparative example, the positions of the electric wiring unit 701 and the element substrate 702 in the scanning direction are defined based on the width of the electric wiring unit 701. That is, even in a case when it is possible to put further close to the cartridge 700*b* if it is only the element substrate 702, it has been difficult to put the element substrate 702 further close to the cartridge 700*b* because of the width of the electric wiring unit 701.

Figure 8:
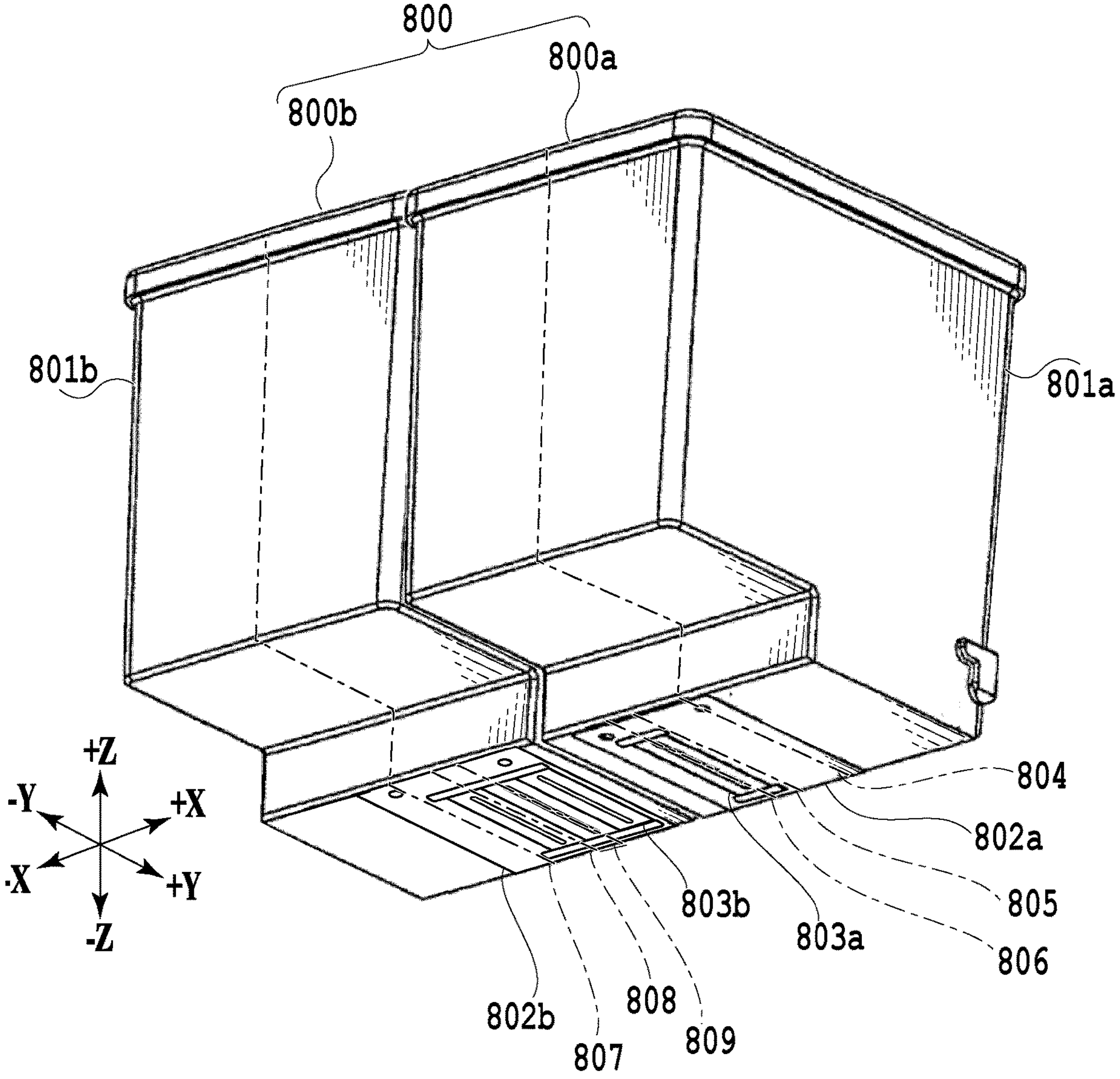
FIG. 8 is an exterior perspective view of a second head cartridge set in an embodiment.

FIG. 8 is an exterior perspective view of a second cartridge set 800 in the present embodiment. In FIG. 8, the second cartridge set 800 is in a state of being mounted on the carriage 101 (see FIG. 1) that can be moved in the scanning direction (the X direction).

As illustrated in FIG. 8, the second cartridge set 800 includes a third liquid ejection head cartridge 800*a* and a fourth liquid ejection head cartridge 800*b*. The third liquid ejection head cartridge 800*a* can store and eject the black color ink. The fourth liquid ejection head cartridge 800*b* can store and eject the color ink. The second cartridge set 800 is arranged such that the third liquid ejection head cartridge 800*a* and the fourth liquid ejection head cartridge 800*b* are adjacent to each other along the scanning direction in the state of being mounted on the carriage 101 (see FIG. 1).

The third liquid ejection head cartridge 800*a* includes a third storage unit 801*a* storing the black color ink. The third liquid ejection head cartridge 800*a* includes a third electric wiring unit 802*a* that can receive a signal transmitted from the liquid ejection apparatus 100 (see FIG. 1) and a third element substrate 803*a* that can eject the black color ink. The third element substrate 803*a* is electrically connected to the third electric wiring unit 802*a*.

In FIG. 8, a sixth center line 804 indicates a line passing through the center of a main body of the third liquid ejection head cartridge 800*a* in the scanning direction (the X direction) and extending along the depth direction (the Y direction). A seventh center line 805 indicates a line passing through the center of the third electric wiring unit 802*a* in the scanning direction (the X direction) and extending along the depth direction (the Y direction). An eighth center line 806 indicates a line passing through the center of the third element substrate 803*a* in the scanning direction (the X direction) and extending along the depth direction (the Y direction). The seventh center line 805 is in a position closer to the fourth liquid ejection head cartridge 800*b* than the sixth center line 804. The eighth center line 806 is in a position closer to the fourth liquid ejection head cartridge 800*b* than the seventh center line 805.

The fourth liquid ejection head cartridge 800*b* includes a fourth storage chamber 801*b* storing the color ink. The fourth liquid ejection head cartridge 800*b* includes a fourth electric wiring unit 802*b* that can receive the signal transmitted from the liquid ejection apparatus 100 (see FIG. 1) and a fourth element substrate 803*b* that can eject the color ink. The fourth element substrate 803*b* is electrically connected to the fourth electric wiring unit 802*b*.

In FIG. 8, a ninth center line 807 indicates a line passing through the center of a main body of the fourth liquid ejection head cartridge 800*b* in the scanning direction (the X direction) and extending along the depth direction (the Y direction). A tenth center line 808 indicates a line passing through the center of the fourth electric wiring unit 802*b* in the scanning direction (the X direction) and extending along the depth direction (the Y direction). An eleventh center line 809 indicates a line passing through the center of the fourth element substrate 803*b* in the scanning direction (the X direction) and extending along the depth direction (the Y direction). In the scanning direction (the X direction), the tenth center line 808 is in a position closer to the third liquid ejection head cartridge 800*a* than the ninth center line 807. In the scanning direction (the X direction), the eleventh center line 809 is in a position closer to the third liquid ejection head cartridge 800*a* than the tenth center line 808.

Thus, in the scanning direction (the X direction), a distance from the eighth center line 806 to the eleventh center line 809 is shorter than a distance from the seventh center line 805 to the tenth center line 808. According to the configuration of the present embodiment, it is possible to position the center of each element substrate closer to the inner side of the second cartridge set 800 than the center of each electric wiring unit in the scanning direction of each cartridge.

Therefore, the second cartridge set 800 in the present embodiment can improve the printing speed more than the cartridge set 700 of the comparative example does.

According to the liquid ejection head cartridge of the present disclosure, it is possible to further improve the printing speed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A cartridge set comprising:

a first cartridge and a second cartridge configured to eject a liquid while moving in a scanning direction in a state of being mounted on a liquid ejection apparatus, wherein the first cartridge includes a first storage unit configured to store the liquid, a first element substrate including a first ejection port configured to eject the liquid and a first element configured to generate energy used to eject the liquid, and a first electric wiring member electrically connected with the first element substrate, the second cartridge includes a second storage unit configured to store the liquid, a second element substrate including a second ejection port configured to eject the liquid and a second element configured to generate energy used to eject the liquid, and a second electric wiring member electrically connected with the second element substrate, the second cartridge is arranged in parallel to the first cartridge along the scanning direction, and, in the scanning direction, a distance from a center of the first element substrate to a center of the second element substrate is shorter than a distance from a center of the first electric wiring member to a center of the second electric wiring member.

2. The cartridge set according to claim 1, wherein the center of the first element substrate in the scanning direction is in a position closer to the second cartridge arranged in parallel along the scanning direction than the center of the first electric wiring member in the scanning direction.

3. The cartridge set according to claim 1, wherein the first element substrate is arranged on a first bottom portion of a first housing including the first storage unit, the first electric wiring member has flexibility and is provided along a first front wall portion to the first bottom portion of the first housing, the second element substrate is arranged on a second bottom portion of a second housing including the second storage unit, and the second electric wiring member has flexibility and is provided along a second front wall portion to the second bottom portion of the second housing.

4. The cartridge set according to claim 1, wherein, in the scanning direction, a distance from the center of the first electric wiring member to the center of the second electric wiring member is shorter than a distance from the center of the first storage unit to the center of the second storage unit.

5. The cartridge set according to claim 1, wherein the liquid stored in the first cartridge and the second cartridge is ink, and the first element substrate ejects a different type of ink from ink ejected by the second element substrate.

6. The cartridge set according to claim 1, wherein the first cartridge and the second cartridge are configured to be attachable to and detachable from a carriage included in the liquid ejection apparatus and movable in the scanning direction.

7. The cartridge set according to claim 6, wherein the first electric wiring member and the second electric wiring member receive a predetermined electric signal transmitted from the liquid ejection apparatus in a state of being electrically connected with a predetermined surface of the carriage.

8. A liquid ejection apparatus comprising:

a cartridge set including a first cartridge and a second cartridge; and a movement unit configured to move the cartridge set in a scanning direction in a state where the cartridge set is mounted on the movement unit, wherein the first cartridge and the second cartridge eject a liquid while moving in the scanning direction in a state of being mounted on the liquid ejection apparatus, the first cartridge includes a first storage unit configured to store the liquid, a first element substrate including a first ejection port configured to eject the liquid and a first element configured to generate energy used to eject the liquid, and a first electric wiring member electrically connected with the first element substrate, the second cartridge includes a second storage unit configured to store the liquid, a second element substrate including a second ejection port configured to eject the liquid and a second element configured to generate energy used to eject the liquid, and a second electric wiring member electrically connected with the second element substrate, the second cartridge is arranged in parallel to the first cartridge along the scanning direction, and, in the scanning direction, a distance from a center of the first element substrate to a center of the second element substrate is shorter than a distance from a center of the first electric wiring member to a center of the second electric wiring member.

9. The liquid ejection apparatus according to claim 8, further comprising a conveyance unit configured to convey a printing medium in a conveyance direction crossing the scanning direction.

10. The liquid ejection apparatus according to claim 8, further comprising:

a first tank including a replenishing port configured to replenish a first liquid from outside of the liquid ejection apparatus; and a second tank including a replenishing port configured to replenish a second liquid from outside of the liquid ejection apparatus, wherein the first cartridge includes a first supply port configured to supply the liquid supplied from the first tank to the first storage unit, and the second cartridge includes a second supply port configured to supply the liquid supplied from the second tank to the second storage unit.

11. The liquid ejection apparatus according to claim 8, wherein the movement unit includes a predetermined surface configured to transfer a predetermined electric signal outputted by a control unit, and the first electric wiring member and the second electric wiring member receive the predetermined electric signal in a state of being connected with the predetermined surface.

* * * * *